United States Patent [19]

Mielke et al.

[11] Patent Number: 4,831,918

[45] Date of Patent: May 23, 1989

[54] LIGHT ALLOY PISTONS WITH REINFORCING INSERTS FOR THE PISTON PIN BORES

[75] Inventors: Siegfried Mielke, Neckarsulm; Norman Seitz, Untereisesheim, both of Fed. Rep. of Germany

[73] Assignee: Kolbenschmidt Aktiengesellschaft, Neckarsulm, Fed. Rep. of Germany

[21] Appl. No.: 121,314

[22] Filed: Nov. 16, 1987

[30] Foreign Application Priority Data

Nov. 21, 1986 [DE] Fed. Rep. of Germany ....... 3639806

[51] Int. Cl.$^4$ .............................. F16J 1/16; F16J 1/02; F16J 1/01
[52] U.S. Cl. ........................................ 92/222; 92/187
[58] Field of Search ................. 92/212, 213, 222, 223, 92/224, 228, 248, 187, 238; 123/193 P; 29/156.5 R

[56] References Cited

U.S. PATENT DOCUMENTS

| | | | |
|---|---|---|---|
| 2,035,692 | 3/1936 | Dietrich | 92/238 X |
| 3,324,772 | 6/1967 | Wittstock | 92/222 X |
| 3,564,575 | 2/1971 | Catherall | 92/228 X |
| 4,498,219 | 2/1985 | Ban et al. | 92/212 X |
| 4,548,126 | 10/1985 | Donomoto et al. | 92/212 X |
| 4,643,078 | 2/1987 | Ban | 92/212 |
| 4,679,493 | 7/1987 | Munro et al. | 92/212 |
| 4,694,735 | 9/1987 | Tatematsu et al. | 92/209 X |

FOREIGN PATENT DOCUMENTS

| | | | |
|---|---|---|---|
| 120755 | 7/1984 | Japan | 92/228 |
| 401581 | 11/1933 | United Kingdom | 92/224 |
| 403390 | 12/1933 | United Kingdom | 92/224 |

Primary Examiner—Robert E. Garrett
Assistant Examiner—George Kapsalas
Attorney, Agent, or Firm—Sprung Horn Kramer & Woods

[57] ABSTRACT

In a light alloy piston for internal combustion engines, a fibrous insert body is embedded in the cast material adjacent to each of the bosses defining the piston pin bores. In order to minimize the costs of manufacturing such piston, the fibrous body extends only above the horizontal plane which includes the piston pin axis between that plane and the piston head and on both sides of the plane which includes the piston pin axis and the piston axis extends over not more than the load-carrying length of the boss defining the piston pin bore.

10 Claims, 1 Drawing Sheet

LIGHT ALLOY PISTONS WITH REINFORCING INSERTS FOR THE PISTON PIN BORES

BACKGROUND OF THE INVENTION

1. Field of the Invention

This invention relates to a light alloy piston for internal combustion engines, particularly for diesel engines, comprising an insert which consists of a body of fibers and/or whiskers and is embedded in the cast material adjacent to each piston pin boss.

2. Description of the Prior Art

The increase of the ignition pressures in modern internal combustion engines requires the cast light alloy pistons, usually made from conventional aluminum-silicon alloys, to be designed for a higher strength particularly adjacent to the surfaces in contact with the piston pins. Even when the parts which serve to mount the piston pin in the bosses defining the piston pin bores are designed to withstand high loads, e.g., in that the connecting rod has a width of 35%, the piston pin has a diameter of 42% and the piston pin has a length of up to 82% of the piston diameter and the bearing surface determined by the diameter and the contact length amounts to about 22% of the surface area of the piston head, a maximum combustion pressure from 150 to 170 bars will cause a pressure from 680 to 770 bars to be applied in the bosses defining the piston pin bores. Said values are in excess of the limit of about 650 bars for which a cast light alloy piston can reliably be designed with conventional bosses defining the piston pin bores if an adequate expandible length in excess of 20% of the piston diameter is to be ensured.

In an attempt to retain the design of the inexpensive light alloy piston also for higher loads, it has already been proposed to give that part of the piston pin bore which is nearer to the connecting rod a conically flaring shape (German Patent Publication No. 21 52 462) or to taper the bores adjacent to the inner edge of the piston pin bosses so as to obtain a more uniform distribution of the considerable pressure applied (Zeitschrift 42, No. 10/1981, pages 409–412, Franckhsche Verlagshandlung, Stuttgart). But the change of the stress distribution adjacent to the interface between the piston pin and the piston produces undesired results regarding the stresses arising in other portions of the light alloy piston. For instance, in light alloy pistons formed in the piston head with a combustion chamber recess a stress increase in the pressure-backpressure direction and in approximately the same degree in the direction of the piston pin has been observed in those regions of the rim of the combustion chamber recess which are subjected to the highest gas forces.

In order to permit higher combustion pressures to be taken up without a need for a change of material, it has been proposed to provide a partial fibrous reinforcement preferably at the piston head, in the ring zone, in the bosses and in the skirt (company publication: 75 Jahre Kolbenschmidt, page 47, Kolbenschmidt AG, Neckarsulm, 1985). Whereas fiber reinforced light alloy pistons have better properties from the aspect of mechanical technology than light alloy pistons made from the conventional aluminum alloys, their manufacture is much more expensive.

SUMMARY OF THE INVENTION

For this reason it is an object of the present invention to adopt, in light alloy pistons comprising reinforcing fibers or whiskers embedded in the cast material of the bosses defining the piston pin bores, a compromise between the improvement of the mechanical properties, e.g., of the endurance limit, wear resistance and thermal expansion, by the provision of the reinforcing fibers or whiskers, and the expenditure involved in the embedding of the reinforcing fibers or whiskers in the cast material.

That object is accomplished in that the inserts are embedded above that horizontal plane which includes the piston pin axis and extend on both sides of that plane which includes the piston pin axis and the piston axis and at least over part of the load-carrying length portion of the bosses defining the piston pin bores.

In a preferred embodiment of the invention, the insert has, in the direction of the piston axis, a length of at least $0.5\ d_p$, preferably 0.75 to $1.75\ d_p$.

Each insert which extends on both sides of the plane which includes the piston pin axis and the piston axis has a width of at least $0.25\ d_p$, preferably at least $0.49\ d_p$.

Where particularly high loads are expected, the insert may have such a width as to extend also over the supporting ribs of the bosses defining the piston pin bores.

In accordance with a further feature of the invention, the inserts extend over at least 25% and preferably over 40 to 50% of the load-carrying length portion of the bosses defining the piston pin bores. If necessary, the inserts may extend over the entire load-carrying length portion of the bosses defining the piston pin bores. The fibers of the fibrous bodies suitably extend in a plane which is preferably parallel to the plane of the piston head, and in that plane preferably have a random orientation.

It has been found that bodies consisting of $Al_2O_3$ fibers and bodies consisting of SiC whiskers are particularly suitable for the provision of the selective fibrous reinforcement. On the other hand, other fibers or whiskers, such as fibers of aluminum silicate and steel and whiskers of potassium titanate, alumina and silicon nitride, may also be used.

The advantages afforded by the invention reside particularly in that the use of the partial reinforcement, consisting of fibers or whiskers in the light alloy piston adjacent to the bosses defining the piston pin bores, is compatible with the making of light alloy pistons by the conventional casting technology and ensures that the bodies consisting of fibers or whiskers will be effectively impregnated by the light alloy and the use of the inserts will reliably improve the properties of the piston from the aspect of mechanical technology.

BRIEF DESCRIPTION OF THE DRAWINGS

A light alloy piston designed in accordance with the invention is shown by way of example in the drawing, in which.

DETAILED DESCRIPTION OF THE PREFERRED EMBODIMENT

Figure 1:
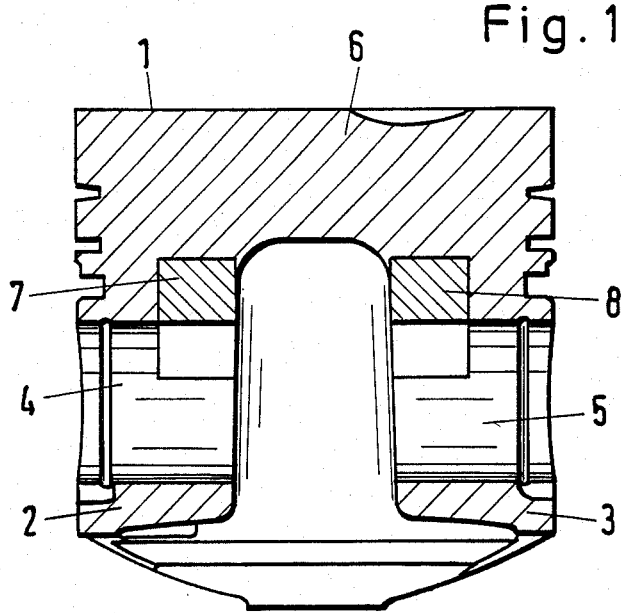
FIG. 1 is a sectional view taken on the plane which contains the piston axis and the piston pin axis.
Figure 2:
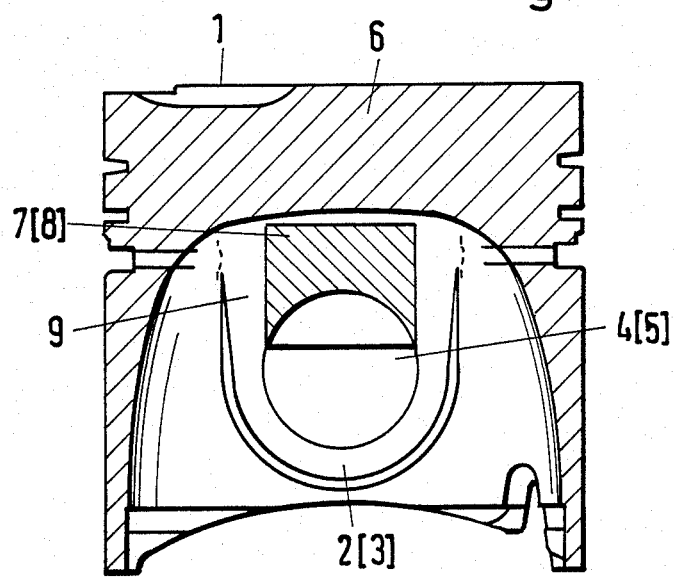
FIG. 2 is a sectional view taken on the plane which extends through the piston axis at right angles to the direction of the piston pin axis.

Referring to FIGS. 1 and 2, the cast light alloy piston 1 is made of an aluminum-silicon alloy of the type AlSi$_{12}$CuNiMg. A fibrous body 7, 8 consisting of Al$_2$O$_3$ fibers is embedded in the cast material in each of the bosses 2, 3 defining the piston pin bores 4, 5 and is spaced 0.5 $d_p$ ($d_p$=piston pin diameter) from the horizontal plane which contains the piston pin axis and is disposed between said plane and the piston head (6). The fibrous body 7, 8 has a length of 0.75 $d_p$ and a width of 0.95 $d_p$ and extends from the inner edge of the boss 2, 3 defining the piston pin bore 4, 5 over 60% of the load-carrying length portion of said boss. The inserts 7, 8 extend approximately as far as to the inner ends of the stiffening ribs 9. The Al$_2$O$_3$ fibers extend in a plane which is parallel to the plane of the piston head and have a random orientation in that plane. In the fibrous bodies, the volume ratio of light alloy to fibers is 80:20.

What is claimed is:

1. In a light alloy piston for internal combustion engines, particularly for diesel engines, comprising an insert consisting of a body of fibers or whiskers and embedded in cast material adjacent to each piston pin boss, the improvement wherein the inserts are embedded above a horizontal plane which includes the piston pin axis and extend on both sides of a plane which includes the piston pin axis and the piston axis and at least over part of the load-carrying length portion of the bosses defining the piston pin bores, wherein each insert has one end which is nearer to the connecting rod and is spaced by not more than 0.5 $d_p$ from the horizontal plane which includes the piston pin axis, where $d_p$ is the diameter of the piston pin, wherein the inserts have a length of at least 0.5 $d_p$ in the direction of the piston axis and a width of at least 0.25 $d_p$.

2. A light alloy piston according to claim 1, wherein each insert has one end which is nearer to the connecting rod and is spaced from 0 to 0.12 $d_p$ from the horizontal plane which includes the piston pin axis, where $d_p$ is the diameter of the piston pin.

3. A light alloy piston according to claim 1, wherein the inserts have in the direction of the piston axis a length of 0.75 to 1.75 $d_p$.

4. A light alloy piston according to claim 1, wherein the inserts extend on both sides of the plane which includes the piston pin axis and the piston axis and each of said inserts has a width of at least 0.49 $d_p$.

5. A light alloy piston according to claim 1, wherein the the piston has stiffening ribs and the inserts are sufficiently wide to extend over the stiffening ribs.

6. A light alloy piston according to claim 5, wherein the inserts extend over at least 25% of the load-carrying length portion of the bosses defining the piston pin bores.

7. A light alloy piston according to claim 5, wherein the inserts extend over 40 to 50% of the load-carrying length portion of the bosses defining the piston pin bores.

8. A light alloy piston according to claim 5, wherein the inserts extend over the entire load-carrying length portion of the bosses defining the piston pin bores.

9. A light alloy piston according to claim 8, wherein the fibers of the inserts extend in a plane.

10. A light alloy piston according to claim 8, wherein the fibers of the inserts extend in a plane, which is parallel to the piston head.

* * * * *